Dec. 13, 1949

A. S. NORCROSS

2,491,389

APPARATUS FOR MEASURING THE VISCOSITY
OF LIQUIDS IN TANKS

Filed Sept. 1, 1944

Dec. 13, 1949     A. S. NORCROSS     2,491,389
APPARATUS FOR MEASURING THE VISCOSITY
OF LIQUIDS IN TANKS
Filed Sept. 1, 1944     4 Sheets-Sheet 4

Fig. 8.

Patented Dec. 13, 1949

2,491,389

UNITED STATES PATENT OFFICE 2,491,389

APPARATUS FOR MEASURING THE VISCOSITY OF A LIQUID IN A TANK

Austin S. Norcross, Waban, Mass.

Application September 1, 1944, Serial No. 552,292

12 Claims. (Cl. 73—57)

My invention relates to improvements in apparatus for measuring the viscosity of a liquid in a tank. While my invention may be employed in any device using a viscous fluid, it is particularly advantageous in measuring the viscosity of a size used in slashing cotton warps prior to weaving in the loom.

An object of the specific embodiment of my invention shown is to provide a viscosimeter which is positive in its action. I preferably employ the principle of mechanically measuring the viscosity, preferably by forcibly flowing samples of the liquid from said tank through a restricted orifice, measuring the time durations of said flows and transforming the time durations of flows of said samples into electric signals or other electric qualities, the time durations each being a function of each successive viscosity test. I have found in practice that this may be accomplished by measuring the time durations of dropping or falling of a solid member such as a piston or ball through the liquid in the sample fed from the tank which time durations may be readily transformed into electric signals of time durations each therefore a function of each successive viscosity. The device is so constructed that the weight of the freely dropping member is such as to force its weight through any coagulated starch or other material comprising the viscous liquid so that the sampling device will always positively work.

A further feature of my invention is to provide an apparatus composed of simple parts and positive in its action.

A further feature of my invention relates to the means I preferably employ for moving the recording element radially over a chart stopping its effective recording at a zero position and never permitting it to run off the chart.

These and such other objects of my invention as may hereinafter appear will be best understood from a description of the accompanying drawings which illustrate an embodiment thereof.

In the drawings.

Figs. 1ª, 2ª, 3ª, 4ª, and 5ª are detailed sectional views taken through the cage and cam of my viscosimeter illustrating the positions of these parts at various stages in the cycle of operations: Fig. 1ª showing the positions the parts assume just after the apparatus clearing or resetting phase and prior to initiation of the sample loading phase; Fig. 2ª illustrating the positions the parts assume as the loading phase nears its end; Fig. 3ª illustrating the position the parts assume when the loading phase has ended and the device has entered the cocking phase; Fig. 4ª illustrating the position the parts assume when the falling member is made free to fall for the initiation of the firing or sampling phase; and Fig. 5ª illustrating the position the parts assume at the cease firing stage or termination of the sampling or firing phase when the freely falling member has reached the end of its fall and the time duration of its fall has been transformed into electric impulses transmitted to the recording unit and transformed into mechanical movements of an element of the indicating means, the resetting or apparatus clearing phase having taken place as the parts are moved from the position shown in Fig. 5ª to the position shown in Fig. 1ª, thus completing the cycle.

Fig. 1ᵇ is a fragmentary side elevation of the resetting cam and associated parts in the position assumed in Fig. 1.

Figs. 1ᶜ, 2ᶜ, 3ᶜ, 4ᶜ and 5ᶜ are detailed sectional views taken through the lower end of the tube and piston of my improved sampling device, illustrating the positions these parts assume in their corresponding Figs. 1ª to 5ª.

In the drawings, wherein like characters of reference generally indicate like parts throughout, 20 indicates a device or apparatus for measuring the viscosity of a liquid in a tank constructed in accordance with my invention. In the apparatus specifically shown and diagrammatically illustrated in Fig. 1, I successively forcibly flow similar fixed quantities of a viscous fluid under a substantially constant pressure through a restricting orifice 22 of a relatively small predetermined size and successively energize an electric circuit for time durations equal to the successive time durations of said successive flows and by said successive flows of current successively move a movable member 24 laterally over a chart 26 moving at a fixed rate successive amounts indicating the said successive time durations of the said successive flows of liquid. In the specific embodiment of the apparatus shown, the successive flows of fluid are provided by confining a vertical column of liquid 28 in a true cylinder 29 taken from the liquid 30 in a tank 32 and successively freely dropping a member 36, spaced such a distance from the wall 34 of said cylinder as to permit the flow of viscous fluid between said cylinder wall and falling member, from a fixed point 38 in said cylinder to the bottom of said cylinder to flow annular streams of liquid 40 upwards through the annular orifice 22 provided around the edge of said freely falling member 36.

Figures 1, 1A, 1B:
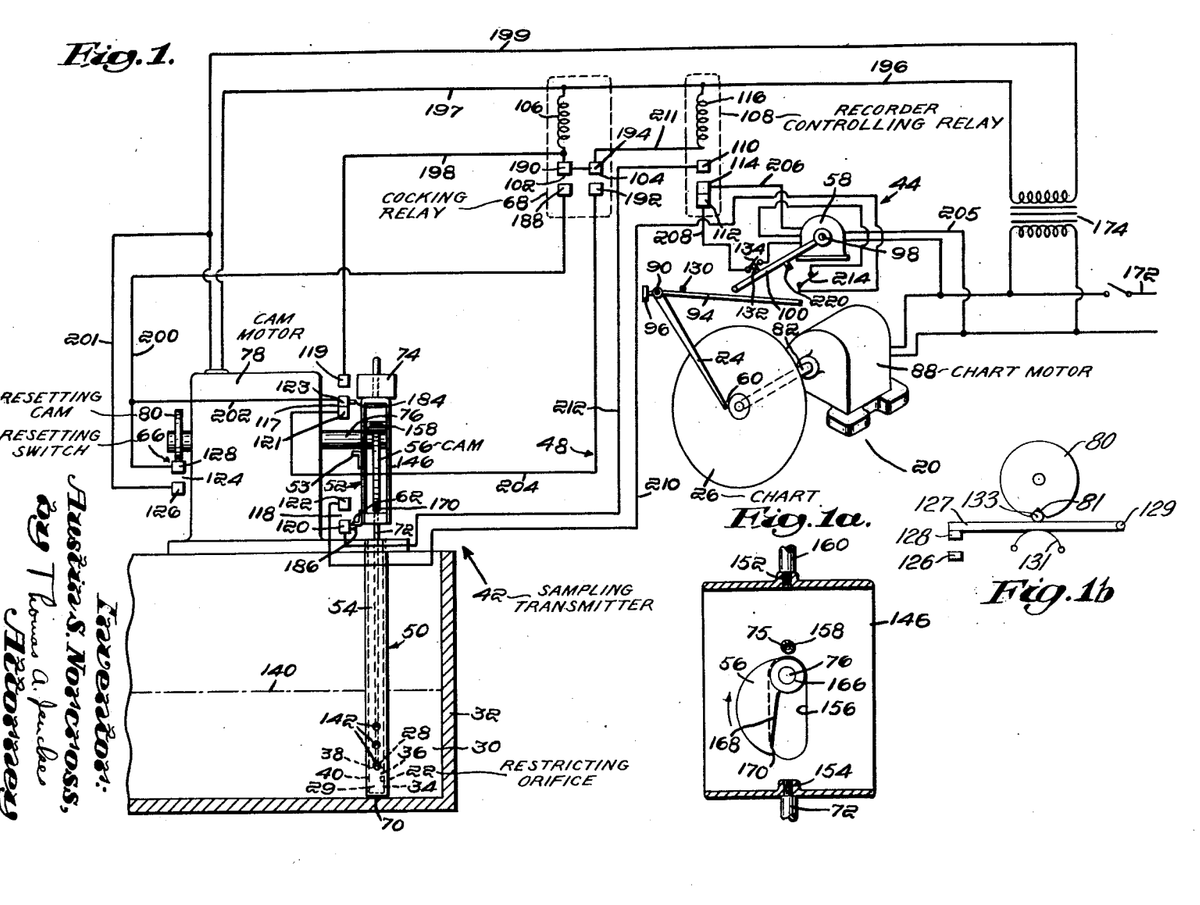
Fig. 1 is a diagrammatic view of an apparatus constructed in accordance with my invention showing parts of the sampling unit in section and parts of the recording element in perspective and a diagrammatic illustration of the associated electric parts, Fig. 1 showing the positions the parts assume just after the apparatus clearing or resetting phase and prior to initiation of the sample loading phase.
Figure 1C:
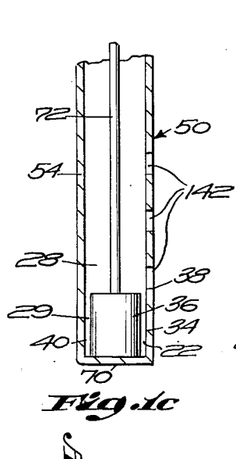

In my preferred embodiment, I have successively provided the samples between said successive intervals of flow caused by said successive droppings of said droppable member 36 by successively raising said droppable member 36 between the intervals of its falling movement to flow annular streams of liquid downwardly through said orifice 22 to the bottom of said column 28 around the edge of said freely droppable member 36 as it is being raised, said samples being drawn from the liquid 30 in a tank 32 so that another sample will be ready for the measuring phase in the next cycle of operation.

I provide means 42 to cylically transform successive values of said viscosity into electric signals of time durations each a function of each successive viscosity and means 44 to transform said electric signals into movements of a member 24 of an indicating or recording means so that said electric impulses may be transmitted in any suitable manner but are preferably transmitted from the sampling means 42 to the indicating or recording means 44 through the medium of electric circuits 48. Specifically, my invention also includes the measuring means 50 to successively forcibly flow similar fixed quantities of the viscous fluid from said tank 32 under a substantially constant pressure through the restricted orifice 22 in accordance with the method hitherto described. The measuring means 50 is provided with suitable means 52 attached thereto to successively energize the electric circuits 48 for time durations equal to successive time durations of said successive flow, including a starting means 53 and a stopping means 62. I provide a continuously rotatable member such as the cam 56 to control the measuring means 50 to cylically flow fixed quantities of said viscous fluid under substantially constant pressure through the restricted orifice 22 during a portion of said cycle of revolution of said member 56.

As the indicating or recording means 44 in the embodiment shown, I also provide a reversible electric motor 58 having a pen arm 24 movable laterally over a recording surface 26, normally energized to move said pen arm to a zero position, the means 53 hitherto described to energize the circuits 48 at the initiation of fluid flow in each cycle functioning to start said motor 58 in the opposite direction to move said pen arm laterally over said chart away from zero position 60. I also provide means 62 to electrically deenergize said motor at a variable point in each cycle coincident with the cessation of fluid flow to stop the lateral movement of said pen arm 24, and means 66 operable at a fixed subsequent point of each cycle to electrically energize said motor to return said pen arm 24 to zero position 60.

In the specific embodiment shown, the sampling unit 42 includes the sampling means 50 which comprises a cylinder 54 extending vertically below the level of the viscous fluid 30 in the tank 32 to be measured and having a closed lower end 70. The droppable member 36 comprises a piston 36 of less height than that of the portion 29 of the cylinder through which the piston falls and of less circumference than that of the inner periphery of said cylinder, to permit respective counterflows of annular columns of the viscous liquid to be measured through the orifice 22 on the up and down movements of the piston 36 in said cylinder 54. A piston rod 72 preferably weighted as at 74 projects upwardly from said piston 36 and has a lateral projection 75 (Fig. 1ᵃ) connected thereto provided with a roller 158. I also employ a cam shaft 76, provided with a cam 56 abutting said projection 75 to raise said piston 36 and to permit it to drop freely, and a motor 78 for rotating said cam shaft. The resetting or clearing means 66 also includes a cam 80 mounted on said cam shaft 76. The indicating means or recorder 44 comprises a recorder shaft 82 having chart holding means 84 for holding the chart 26 mounted thereon and a synchronous motor 88 for rotating said shaft 82. The recording pen arm 24 is provided with a pivot shaft 90 pivotally mounted at a distance from said shaft 82 to pivot the pen or other indicating member 92 substantially radially of said chart 26 and an operating arm 94 is mounted on said pivot shaft 90 preferably weighted as by the weight 96 to pivot said pen arm to its radially innermost zero position 60. I also provide the reversible motor 58 having a partial revolution throw for moving said recording arm 24 radially outwardly, having a motor shaft 98 having an operating arm 100 projecting radially therefrom to abut said recording arm operating arm 94 to urge said recording arm 24 radially outwardly and to function as a positionable abutment on reverse rotation of said reversible motor 58 to permit the gravity bias of said weight 96 to move said pen arm 24 radially inwardly to zero position. I also provide a cocking relay 68 having doublt pole double throw contact pairs 102 and 104 and a coil 106 energized when said piston 36 is moved to its uppermost position. I also provide a firing relay 108 having double throw single pole contacts having upper and lower fixed contacts 110 and 112 and a movable contact 114 providing a double throw switch and a coil 116 energized through said cocking relay 68 as the piston drops, to throw said movable contact 114 against said fixed contact 110 of said firing relay 108 into a position to start said reversible motor 58 to move said pen arm 24 laterally from zero position when the circuit is completed thereto. As also stated I provide means 52 to control the measuring cycle and to transform the time durations of dropping of said movable member 36 into corresponding electrical impulses. For this purpose I provide a starting switch 117 comprising a double throw single pole switch having a fixed upper contact 119, a fixed lower contact 121 and an intermediate movable contact 123 normally abutting said lower fixed contact 121.

I also provide suitable means 53 mechanically actuated by said piston to make the starting switch 117 perform the double function of cocking the relay coil 68 as the piston completes its loading stroke and as it drops away from its highest point on the firing stroke to permit the poles of said switch to change to actuate the firing relay 108 through the cocking relay 68 in the manner explained. I also provide means 62 to stop the transmission of electricity, comprising a switch 118 having the fixed contact 122 and the movable contact 120 actuated as said piston 36 comes adjacent the end of its falling stroke to break the flow of current through said firing relay 108 to stop said motor 58. The mechanical means 52 to actuate the switches 117 and 118 on movements of the piston 36 will be described later. I also provide a releasing or resetting switch 124 having a fixed contact 126 connected indirectly to the transformer 174 by the line 201 connected to the motor line 199 and a movable contact 128 connected to said relays 68 and 108 and actuated by said cam 80 to deenergize said relays to permit the double throw contact 114 of the firing relay 108 to drop in a direction to actuate said reversible motor to move the pen arm to zero position, during the cycle of revolution of said cam shaft. As shown in Fig. 1b, for this purpose said movable contact 128 may be mounted on the arm 127 pivotally mounted at 129 and normally urged upwardly by the spring 131 to continuously urge a projection 133 therefrom against the periphery of the rotating cam 80. If desired, suitable stop means such as a pin 130 may be provided to abut said pen arm actuating arm 94 to stop the inner radial movement of said pen arm at the zero position 60 and means may be provided operated by said reversible motor shaft, such as the extension 132 therefrom as it nears the inner end of its throw to abut a switch 134 interposed in said circuit to break the circuit to stop said motor 58 a predetermined time after the pen arm reaches its zero position. If desired, the starting contacts of the starting switch 117 may be so located as to energize the coil 116 of the firing relay 108 through said cocking relay 68 after the piston is dropped a predetermined distance, to throw said contact 114 into a position to start said reversible motor 58 and similarly may the stopping switch 118 be mounted to function at a predetermined distance before the end of the falling stroke of the piston 36 to stop said reversible motor 58 so that the respective electric signals will be formed of time durations of a function of a freely falling member. Thus broadly, the electric circuits 48 are connected adjacent said piston rod 72 and to said motor 58 to be energized on successive droppings of said piston rod 72 to actuate said motor 58 amounts to move said recording arm 24 radially outwardly over said chart 26 amounts proportionate to the time durations of said dropping movements of said piston 36 and to permit said motor 58 to return said recording arm 24 to zero position 60 intermediate said intervals of energization.

Figure 6:
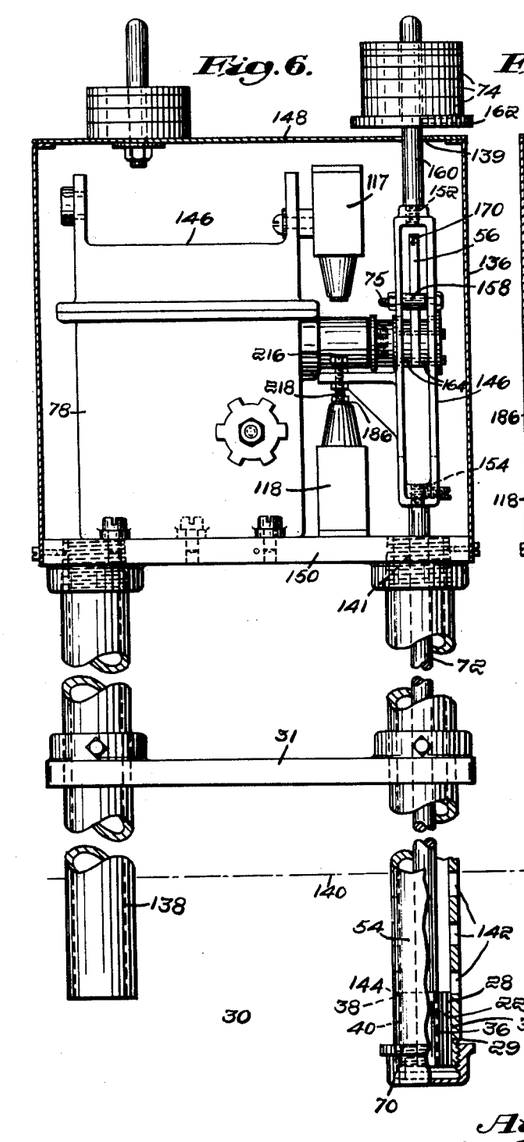
Fig. 6 is a partially sectional side elevation of my viscosimeter illustrating how it is attached to the tank.
Figure 7:
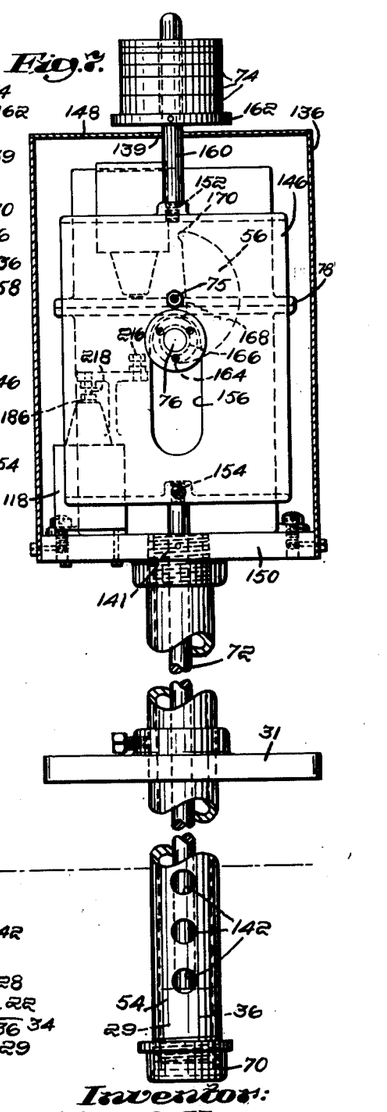
Fig. 7 is a partially sectional front elevation of the parts shown in Fig. 6.

In the preferred embodiment shown, my improved device (Figs. 6 and 7) is specifically constructed as follows: The sampling unit 42 preferably is mounted on the base 150 of a casing 136, detachably mounted on a bracket 31 attached to a tank 32 by means of the cylinder 54 and dummy mounting cylinder 138 extending downwardly from the opposite side of said base 150. The casing is provided with the aligned upper and lower holes 139 and 141 respectively. The cylinder 54 depends vertically from said casing 136 below the level 140 of the viscous liquid to be measured. Said cylinder 54 is provided with a closed lower end 70. Insofar as a main feature of my invention is concerned, the true cylinder 29 inclosing the column 34 of liquid to be measured may be mounted in alignment with the piston 36 in the bottom of the tank. In order, however, for the device to be entirely removable from the tank and for the true cylinder 29 to be at all times in true alignment with the piston 36, the cylinder 54 preferably projects downwardly from the casing 136 in the manner just described, and in order that samples may be readily taken from the liquid 30 in the tank, said cylinder 54 is provided with a plurality of axially spaced perforations 142 below the liquid level 140 and terminating at a spaced distance 144 from the closed lower end 70 of the cylinder 54 providing the true cylinder 29 in which the piston 36 may reciprocate adjacent the closed lower end of the cylinder 54. The piston 36 comprises the freely droppable member of my device and is preferably of a height less than that of said true cylinder 29 and of less circumference than the inner periphery of said cylinder to provide an annular orifice 22 to permit respective counterflows 40 of annular columns of the viscous liquid being measured, on the up and down movements of said piston 36 within said true cylinder 29 and respective radial out-flows and in-flows for true samplings of said viscous liquid through said apertures 142 on said respective up and down piston strokes. The sampling means 50 shown also includes a cage 146 having side walls and open ends vertically reciprocable between the upper wall 148 of said casing and the lower wall 150 of said casing and is provided with vertically aligned rod holes 152 and 154 in the top and bottom walls thereof and vertical slots 156 in the front and rear walls thereof aligned with said vertical rod holes. A cross pin or projection 75, which may have a roller 158 mounted thereon, is interposed between the front and rear walls of said cage above said slots 156. The piston rod 72 projects downwardly from said lower cage hole 154 through said lower casing hole 141 to said piston 36 and the guide rod 160 projects upwardly from the cage upper hole 152 through said upper casing hole 139 and has weight means 74 mounted on the upper end thereof such as on the washer 162 rigidly mounted on the upper end thereof above said casing 136. The weight means 74 may be of varying size so that the weight may be varied. The cam shaft 76 projects through said aligned slots 156 and is provided with the hubs 164 opposite the edges of said slots to ride vertically in said slots to keep said piston 36 in alignment within said cylinder 54 and true cylinder 29. The cam 56 is mounted on said cam shaft 76 intermediate said hubs 164 and the side walls of said cage, to abut said projection 75 comprising the pin 75 extending across the front and rear walls of said cage and the roller 158 mounted thereon where employed. In the preferred embodiment shown, for reasons to be explained, the cam 56 is substantially semicircular but is provided with a hole 166 near one semicircular end thereof for mounting on said cam shaft 76 so that it may extend circumferentially approximately through one-third of the circumference of said cam shaft, diametric edge 168 rearmost, said edge terminating in a rearwardly extending tit 170 at the outer end thereof. Said cam 56 is thus mounted to rotate intermediate said cage walls to abut said pin 75 to raise said cage 146 and hence piston 36 the desired amount which is accomplished with the structure shown during approximately a third revolution from the position shown in Fig. 1a to the position shown in Fig. 3a and permit it to drop immediately thereafter from the position shown in Fig. 3a to the position shown in Fig. 5a. The tit 170 permits the piston 36 to drop without any possible interference with the cam 56. The resetting cam 80 is also mounted on said cam shaft 76.

As stated, the motor 78 is provided for rotating said cam shaft 76.

Figure 8:
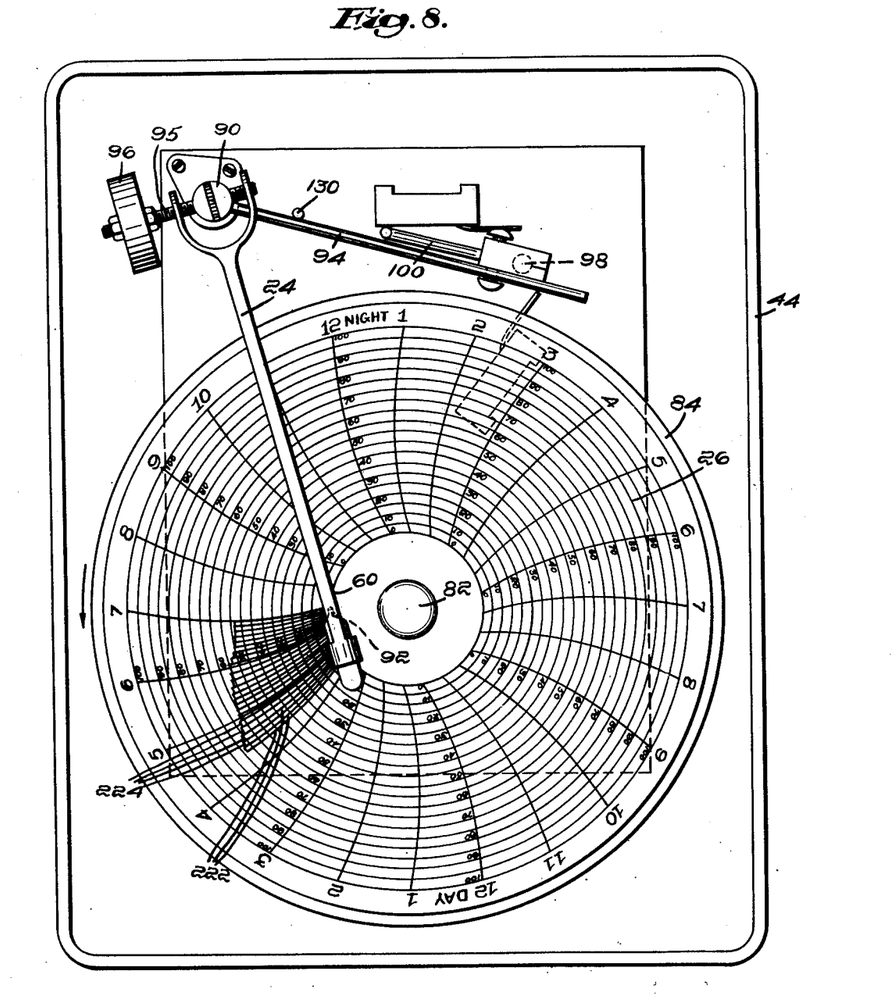
Fig. 8 is a front elevation of the recording unit of my invention.

In the preferred embodiment shown I employ a recorder or indicating means 44 shown more particularly in Fig. 8 comprising the recorder shaft 82 having a chart holding disk 84 mounted thereon with a chart 26 suitably secured thereto. A synchronous motor 88 is provided for rotating said shaft 82 at constant speed. The recording pen arm 24 has a pivot shaft 90 pivotally mounted at a distance from said shaft 82 to pivot said pen arm 24 and attached pen 92 substantially radially of said chart 26 and an operating arm 94 mounted on said pivot shaft 90. An extension 95 of said operating arm 94 is provided on which the weight 96 is mounted, to pivot said pen arm 24 to its radially innermost zero position. The reversible motor 58 has a partial revolution throw for moving said recording arm 24 radially outwardly as the motor shaft 98 having the operating arm 100 projecting radially outwardly therefrom abuts said recording arm operating arm 94 to urge said recording arm 24 radially outwardly on a forward rotation thereof and to function as a positionable abutment on reverse rotation of said reversible motor 58 to permit said weight 96 to move said pen arm 24 radially inwardly.

The electric circuits for transmitting the electric impulses from the sampling means 42 to the measuring means 44 comprise the circuits 48 hitherto broadly described. Said circuits 48 include the source of supply 172 connected through the transformer 174 to the various switches about to be described and also through the lines 196, 197 and 199 to the motor 78.

To start the firing of the electrical impulses I provide the switch 117 comprising a single pole double throw switch mounted adjacent the upper portion of said cage 146 having the upper fixed contact 119, the lower fixed contact 121 and the intermediate movable contact 123 normally abutting said lower fixed contact 121 and having an actuating arm 184 projecting therefrom. As stated, to stop the transmission of electricity near the end of the dropping movement of the piston 36 I also provide a normally closed stopping switch 118 mounted adjacent the lower portion of said cage 146 having an upper fixed contact 122 and a lower movable contact 120 having an actuating arm 186 projecting therefrom. I also provide a single pole deenergizing resetting switch 124 having a fixed contact 126 and a movable contact 128 mounted adjacent said cam shaft 76. The supplemental cam 80 mounted on said cam shaft 76 to move said movable contact 128 to closed position has an inwardly projecting V-shaped portion 81 to receive the abutment 133 of the arm 127 of the movable contact 128 to open it for a relatively small interval of time just prior to contact of the operating cam 56 with the cage pin 75 on each revolution of said cam 56. The cam 80 and deenergizing switch 124 thus provide the means 66 hitherto referred to for clearing or resetting all electrical elements in the device during a portion of each cycle in the manner hitherto described.

As also stated hitherto, I provide the cocking relay 68 comprising a double pole single throw relay switch having two pairs of fixed and movable contacts, the first pair 102 comprising a fixed contact 188 and a movable contact 190 and the second pair 104 comprising the fixed contact 192 and the movable contact 194, with the movable contacts joined together to move together and the coil 106 connected by the line 196 to one side of the transformer 174 and to the upper movable contact 190 of the first pair 102 of said relay contacts and to the upper fixed contact 119 of the upper cage switch 117 by the line 198, the other contact 188 of said pair being connected to the movable contact 128 of said circuit deenergizing switch 124 by the line 200 and to the movable contact 123 of said upper cage switch 117 by the line 202. The stationary contact 192 of the other pair 104 of said relay contacts is connected to the lower fixed contact 121 of said upper cage switch 117 by the line 204.

As also explained, I provide a firing relay 108 for the reversible motor 58. Said motor 58 has power supplied thereto by the line 205 connected to the source of supply 172 and the firing relay 108 controls the direction of rotation of said motor only. As stated, the reversible motor 58 is normally actuated in the direction to bring the pen arm 24 to zero position 60 and in order to insure this the movable contact 114 of the switch for the firing relay 108 normally drops to contact the fixed contact 112. The movable contact 114 for this purpose is continuously connected to the motor by the line 206. A reverse rotation line 208 also connects the motor 58 to the lower fixed contact 112 of said firing relay 108 to complete the circuit to normally actuate the motor in a reverse direction to return the pen arm to zero position. The upper fixed contact 110 of the relay is connected by the line 212 to the movable contact 120 of the normally closed stopping switch 118. The fixed contact 122 of said stopping switch is connected by the line 210 to the reversing motor 58. Thus when the coil 116 of the controlling relay 108 is energized by the movement of the movable contact 123 of the starting switch 117, it will pull the movable contact 114 connected to the motor 58 to contact the upper contact 110 to start current flowing through the lines 206, 212, and 210 to the motor 58 to flow current to actuate it in a forward direction to move the pen arm 24 radially outwardly over the chart until said circuit is broken by movement of the movable contact 120 away from the fixed contact 122 of the stopping switch 118 by the arm 186. When the resetting switch 124 functions to break all electrical contacts in the relay the movable contact 114 will drop to contact the fixed contact 112 to actuate the reversible motor 58 in its normal direction as explained through the lines 206 and 208 to move the pen arm 24 radially inwardly over said chart 26 to a zero position 60.

As stated, the normally closed inner movement switch 134 for said pen arm 24 is provided in the line 208 connecting said reversible motor 58 to the fixed contact 112 of said controlling relay 108 and a normally closed outer movement switch 214 for said pen arm 24 is provided in the line 210 connecting said reversible motor to the stationary contact 122 of said lower cage switch 118.

The mechanical means 52 for forming the electrical impulses is constructed as follows: An arm or other means 53 projects laterally from the cage 146 to abut the arm 184 projecting laterally from the movable contact 123 of said upper cage switch 117 shortly before the cam 56 raises said cage 146 and piston 36 to their uppermost position and an arm 62 projects laterally from said cage 146 to abut the arm 186 projecting from the lower cage switch movable contact 120 shortly before the cage drops to its lowermost position so as to make and break the circuit through the controlling relay 108 to the motor 58, at points spaced from the beginning and the end of the dropping movement of the dropping member or piston 36. As stated, the stop 130 is provided to abut said pen arm actuating arm 94 to stop the inner radial movement of said pen arm 24 at the zero position 60. To actuate the switch 134, as stated, the projection 132 projects from said operating arm 100 of the reversible motor shaft 98 of a length to break the inner movement switch 134 to stop said reversible motor a predetermined time after said pen arm 24 has reached the zero position 60, and a projection 220 extends from said operating arm 100 of the reversible motor shaft 98 of a length to break said pen arm outer movement switch 214 to stop said reversible motor 58 when the pen arm 24 reaches the outer limit of the chart.

Figure 3A:
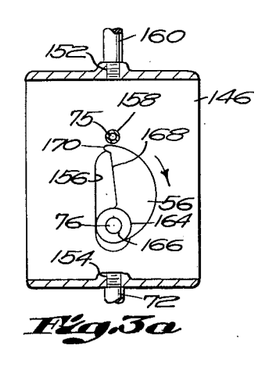
Figures 3C, 4C, 5C:
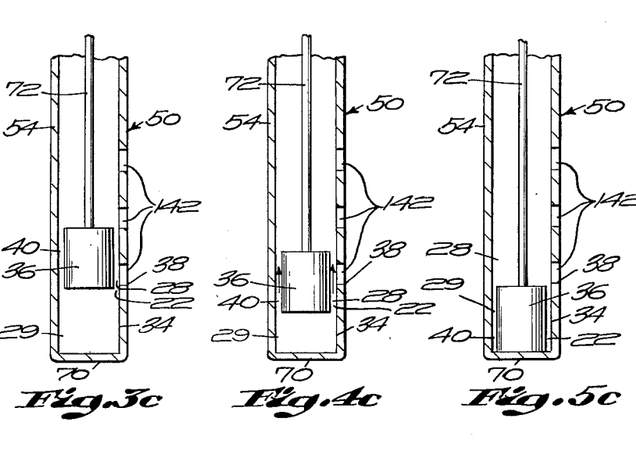

The operation of the device is thus apparent from the diagrammatic showings in Figs. 1, 1ª-5ª, and Figs. 1ᶜ-5ᶜ, Figs. 1, 1ª and 1ᶜ. Figs. 1 and 1ª show the device immediately after the cam 80 has functioned to open the switch 124 to break the connections through the respective coils 106 and 116 of the relays 68 and 108 to permit complete electrical deenergization of the circuits to permit all movable parts of the various switches to drop to their open positions. The cam 80 has just functioned to open the switch 124 to permit the cocking relay switch 68 to open and the movable contact 114 of the firing relay 108 to drop to contact the fixed contact 112 to move the motor 58 in a reverse direction to move the pen arm 24 to zero position 60 in the manner explained. The stop 130 has stopped the pen arm 24 at exactly zero and the arm 132 has functioned to open the switch 134 to shut off the motor at a short interval thereafter. The cage 146 and piston 36 are at the lowermost portion of their strokes. The resetting phase is complete and the loading phase about to commence.

Current passes from the source of supply 172 to the motors 88 and 58, the motor 88 running continuously and the motor 58 if running rotating in the direction to return the pen arm 24 to a zero position.

Figure 2A:
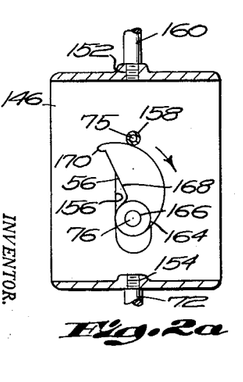
Figure 2C:
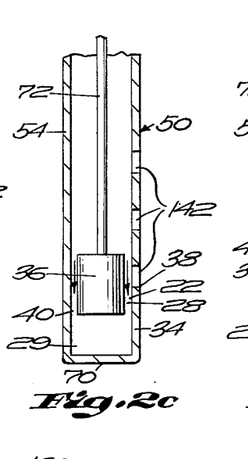

Figs. 2ª and 2ᶜ illustrate the position the parts assume as the cam 56 raises the cage 146 and piston 36 adjacent the upper portion of its stroke (Fig. 2ª). The resetting switch 124 has become closed after the cam 80 has been revolved to bring the projection 133 out of its respective notch, causing said cam to depress said spring arm 127 to urge the movable contact 128 into contact with the fixed contact 126, permitting the flow of current through the various circuits, specifically through the line 200 to the fixed contact 188 of the cocking relay 68 and the stopping switch 118 has also become closed to permit the line 210 to carry the circuit to the motor 58 and the line 212 to take the circuit back to the upper fixed contact 110 of the firing relay 108. This illustrates the loading phase in which the piston 36 is raised upwards to draw fluid 30 from the tank 32 through the perforations 142 down the orifice 22 to the bottom of the true cylinder 29, as shown in Fig. 2ᶜ.

Figs. 3ª and 3ᶜ illustrate the position the parts assume when the cam 56 has raised the cage 146 and piston 36 to the upper portion of their stroke with the projection 53 abutting the projection 184 to raise the movable contact 123 of the starting switch 117 into contact with the upper fixed contact 119 thereof to carry current through the lines 202, movable contact 123 and upper fixed contact 119 of the starting switch 117 to the coil 106 of the cocking relay 68 to energize the coil 106 of the cocking relay 68 to close the double pole switch thereof, to close the contacts 192 and 194 thereof to make it possible for the current to pass to the coil 116 of the firing relay 108 through the line 211, marking the conclusion of the loading phase and the completion of the cocking phase.

Figure 4A:
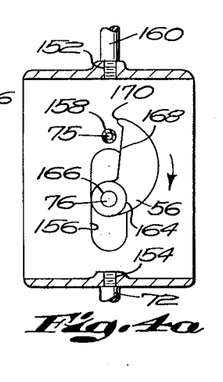
Figure 5A:
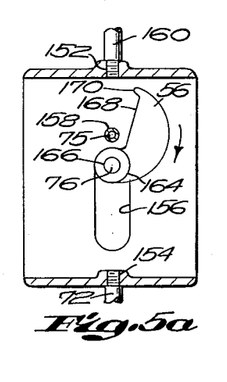

Figs. 4ª and 4ᶜ illustrate the position the parts assume just after the pin 75 has ridden off the tit 170 of the cam 56 to permit the cage 146 and piston 36 to drop by gravity, the projection 53 dropping away from the projection 184 to permit the movable contact 123 of the starting switch 117 to drop to contact the stationary contact 121 to permit current to flow through the line 204, closed contacts 192 and 194 of the cocking relay 68 through the line 211 to energize the coil 116 of the controlling relay 108 thus drawing the movable contact 114 thereof upwards into contact with the fixed contact 110 thereof to complete the circuit to the motor 58 through the contacts 110 and 114 and line 206 to cause it to reverse its direction of rotation and move forwardly in the direction to move the pen arm 24 radially outwardly on the chart 26 marking the completion of the firing stage of the loading or sampling phase, breaking the contact through the line 208 connecting the motor 58 with the lower fixed contact 112 of said firing relay 108. In this view the piston 36 is freely dropping to flow the fluid upwards through the annular orifice 22, as shown in Fig. 4ᶜ.

Figs. 5ª and 5ᶜ illustrate the cease-firing stage at the completion of the firing or measuring phase. The piston 36 has completely dropped to the bottom of the true cylinder 29 and the projection 62 abuts the projection 186 to lower the movable contact 120 of the stopping switch 118 away from the fixed contact 122 thereof, breaking the circuit in the lines 210 and 212 to stop operation of the motor 58 in a direction moving the pen arm 24 radially outwardly over the chart 26. After the resetting switch 124 opens again de-energizing relays 68 and 108, the circuit is completed through contacts 112 and 144 of relay 108 to again rotate motor 58 in the reverse direction to move the pen 24 radially inwardly over the chart 26 to the zero position 60. During this measuring phase it is obvious that the recording arm 24 makes a radial mark 222 on said chart 26 of a length equivalent to the time duration of the dropping of said piston 36, and hence, is a measure of viscosity of the liquid just contained in the true cylinder 29. As shown in Fig. 8, my apparatus draws a plurality of spaced radial lines 222 on the chart 26 one for each test of viscosity. As shown these lines decrease in radial length showing that the viscosity has decreased over a period of time, as frequently occurs in slashing operations. An imaginary broken line 224 joining the ends of the lines 222 may be visualized, thus providing a chart of the viscosity. The cam 56 continues to rotate until the parts again assume the position shown in Fig. 1 for another cycle of the same operation.

It is obvious that I have provided a novel apparatus for measuring viscosity with the advantages explained above.

It is understood that my invention is not limited to the specific embodiment shown or methods described and that various deviations may be made therefrom without departing from the spirit and scope of the appended claims.

What I claim is:

1. An apparatus for measuring the viscosity of a liquid in a tank comprising, in combination a continuously rotatable member, means controlled by said rotatable member to cyclically flow fixed quantities of the said viscous liquid under substantially constant pressure through a restricted orifice during a portion of said cycle of revolution of said member, a reversible electric motor, a pen arm movable over a recording surface, said motor being normally energized to move said pen arm to zero position, means to energize a circuit substantially at the initiation of said liquid flow in each cycle to start said motor in the opposite direction to move said pen arm over said chart away from zero position, means controlled by said flows of viscous liquid to electrically deenergize said motor at a point in each cycle substantially coincident with cessation of liquid flow, to stop said lateral movement of said pen arm and means automatically operable at a fixed subsequent point in each cycle of rotation of said rotatable member to electrically reversely energize said motor to permit said pen arm to be returned to zero position.

2. An apparatus for measuring the viscosity of a liquid in a tank comprising, in combination, means to cyclically flow fixed quantities of the said viscous liquid under substantially constant pressure through a restricted orifice during a portion of said cycle, a reversible electric motor, a pen arm movable over a recording surface, said motor being normally energized to move said pen arm to zero position, means to energize a circuit substantially at the initiation of said liquid flow in each cycle to start said motor in the opposite direction to move said pen arm over said chart away from zero position, means controlled by said flows of viscous liquid to electrically deenergize said motor at a point in each cycle substantially coincident with cessation of liquid flow, to stop said movement of said pen arm and means automatically operable at a fixed subsequent point in each cycle to electrically reversely energize said motor to permit said pen arm to be returned to zero position.

3. A device for continuously recording the viscosity of a liquid in a container, comprising a cylinder extending vertically below the level of the viscous liquid to be measured and having a closed lower end, a piston of less net circumference than the inner periphery of said cylinder to permit respective counterflows of columns of the viscous liquid to be measured on the up and down movements of said piston within said cylinder, a weighted piston rod projecting from said piston, having a lateral projection connected thereto, a cam shaft, and a cam abutting said projection to raise said piston and to permit it to drop freely, a motor for rotating said cam shaft; a recorder comprising a chart holder, means to rotate said chart holder at constant speed, a recording arm movable laterally across said chart holder and a reversible motor normally operated to permit movement of said recording arm to a zero position, an electrical circuit operatively connecting said piston rod and reversible motor energized on successive droppings of said piston from one fixed point in said cylinder to another below it to actuate said reversible motor amounts to move said recording arm over said chart amounts proportional to the time durations of said dropping movements and to reversely actuate said motor to permit said recording arm to be returned to zero intermediate said intervals of energization.

4. A device for continuously recording the viscosity of a liquid in a container, comprising a cylinder extending vertically below the level of the viscous liquid to be measured having a closed lower end and a plurality of axially spaced perforations therein below said liquid level and terminating at a spaced distance from said closed lower end providing a true cylinder adjacent the closed lower end thereof, a piston of less circumference than the inner periphery of said true cylinder, to permit respective counterflows of annular columns of the viscous liquid to be measured on the up and down movements of said piston within said true cylinder and respective mixing outflows and inflows of viscous liquid through said apertures on said respective up and down piston strokes, a weighted piston rod projecting from said piston, a lateral projection connected thereto, a cam shaft carrying a cam abutting said projection to raise said piston and to permit it to drop freely, a motor for rotating said cam shaft; a recorder comprising a chart holder, means to rotate said chart holder at constant speed, a recording arm movable across said chart holder and a reversible motor normally operated to permit movement of said recording arm to a zero position, an electrical circuit operatively connecting said piston rod and reversible motor energized on successive droppings of said piston from one fixed point in said cylinder to another below it to actuate said reversible motor amounts to move said recording arm over said chart amounts proportional to the time durations of said dropping movements and to reversely actuate said motor to permit said recording arm to be returned to zero intermediate said intervals of energization.

5. A device for continuously recording the viscosity of a liquid in a container, comprising a cylinder extending vertically below the level of the viscous liquid to be measured and having a closed lower end, a piston of less circumference than the inner periphery of said cylinder, to permit respective counterflows of annular columns of the viscous liquid to be measured on the up and down movements of said piston within said cylinder, a vertically reciprocable cage having front and rear walls, a crosspin interposed between the front and rear walls of the cage, a piston rod connecting said piston and cage, a cam shaft having a cam thereon abutting said cross pin within said cage to raise said piston and to permit it to drop freely, a motor for rotating said cam shaft; a recorder comprising a chart holder, means to rotate said chart holder at constant speed, a recording arm movable across said chart holder and a reversible motor normally operated to permit movement of said recording arm to a zero position, and an electrical circuit operatively connecting said piston rod and reversible motor energized on successive droppings of said piston from one fixed point in said cylinder to another below it to actuate said reversible motor amounts to move said recording arm over said chart amounts proportional to the time durations of said dropping movements and to reversely actuate said motor to permit said recording arm to be returned to zero intermediate said intervals of energization.

6. A device for continuously recording the viscosity of a liquid in a container, comprising a cylinder extending vertically below the level of the viscous liquid to be measured and having a closed lower end, a piston of less circumference than the inner periphery of said cylinder to permit respective counterflows of annular columns of the viscous liquid to be measured on the up and down movements of said piston within said cylinder, a piston rod projecting from said piston having a lateral projection connected thereto, a cam shaft, a lifting cam mounted on said cam shaft, and having a rearwardly extending tit at its outer end to abut said projection, said cam being adapted to raise said piston during part of a revolution of said cam shaft and permit it to drop freely thereafter, a motor for rotating said cam shaft; a recorder comprising a chart holder, means to rotate said chart holder at constant speed, a recording arm movable across said chart holder and a reversible motor normally operated to permit movement of said recording arm to a zero position and an electrical circuit operatively connecting said piston rod and reversible motor energized on successive droppings of said piston from one fixed point in said cylinder to another below it to actuate said reversible motor amounts to move said recording arm over said chart amounts proportional to the time durations of said dropping movements and to reversely actuate said motor to permit said recording arm to be returned to zero intermediate said intervals of energization.

7. A device for continuously recording the viscosity of a liquid in a tank, comprising a cylinder extending vertically below the level of the viscous liquid to be measured and having a closed lower end, a piston of less net circumference than the inner periphery of said cylinder to permit respective counterflows of columns of the viscous liquid to be measured on the up and down movements of said piston within said cylinder, a weighted piston rod projecting from said piston, a lateral projection connected thereto, a cam shaft, and a cam abutting said projection to raise said piston and to permit it to drop freely, a motor for rotating said cam shaft and a supplemental switch releasing cam also mounted on said cam shaft; a recorder, comprising a chart holder, means to rotate said chart holder at constant speed, a recording arm movable across said chart holder and a reversible motor normally operated to permit movement of said recording arm to a zero position, a cocking relay having double pole contacts and a coil energized by said piston when moved to its uppermost position, a controlling relay having double throw contacts and a coil energized by said piston through said cocking relay a predetermined distance after it drops, to throw said contacts in a position to start said reversible motor to move said pen arm from zero position, a switch in series with said controlling relay actuated by said piston a predetermined distance before the end of its falling stroke, to break the flow of current through said controlling relay to stop said motor and a releasing switch connected to said relays actuated by said supplemental cam to deenergize said relays, to permit the double throw contacts of the controlling relay to throw in the opposite direction to reversely actuate said reversible motor to permit the pen arm to be returned to a zero position, during a revolution of said cam shaft.

8. In a device for transmitting the viscosity of a liquid in a tank, in combination, means to confine a vertical column of said liquid within the liquid in said tank, a member freely droppable from a fixed point in said confining means spaced such a radical distance from the wall of said confining means as to permit the flow of viscous liquid between said wall and droppable member to flow annular streams of liquid upwards around the edge of said freely droppable member as it drops from said fixed point to the bottom of said column, means controlled by said droppable member to successively energize an electric circuit for time durations equal to the successive time durations of dropping of said droppable member from one fixed point in said column to another below it and means for automatically successively raising said droppable member to a dropping position between the intervals of its dropping movement to flow annular streams of liquid down to the bottom of said column around the edges of said rising droppable member drawn from the liquid in said tank.

9. In a device for transmitting the viscosity of a liquid in a tank, in combination, a cylinder extending vertically below the level of the viscous liquid to be measured and having a closed lower end, a piston of less net circumference than the inner periphery of said cylinder to permit respective counterflows of columns of the viscous liquid to be measured on the up and down movements of said piston within said cylinder, a weighted piston rod projecting from said piston, having a lateral projection connected thereto, a cam shaft, and a cam rigidly mounted on said cam shaft abutting said projection to raise said piston and to permit it to drop freely, a motor for rotating said cam shaft and means controlled by said dropping piston to successively energize an electric circuit for time durations equal to the successive time durations of dropping of said piston from one fixed point in said cylinder to another below it.

10. In a device for transmitting the viscosity of a liquid in a tank, in combination, a cylinder extending vertically below the level of the viscous liquid to be measured and having a closed lower end, a piston of less circumference than the inner periphery of said cylinder, to permit respective counterflows of annular columns of the viscous liquid to be measured on the up and down movements of said piston within said cylinder, a vertically reciprocable cage having front and rear walls, a crosspin interposed between the front and rear walls of the cage, a piston rod connecting said piston and cage, a cam shaft having a cam thereon abutting said cross pin within said cage to raise said piston and to permit it to drop freely, a motor for rotating said cam shaft and means controlled by said dropping piston to successively energize an electric circuit for time durations equal to the successive time durations of dropping of said piston from one fixed point in said cylinder to another below it.

11. In a device for transmitting the viscosity of a liquid in a tank, in combination, a cylinder extending vertically below the level of the viscous liquid to be measured and having a closed lower end, a piston of less circumference than the inner periphery of said cylinder to permit respective counterflows of annular columns of the viscous liquid to be measured on the up and down movements of said piston within said cylinder, a piston rod projecting from said piston having a lateral projection connected thereto, a cam shaft, a lifting cam mounted on said cam shaft, and having a rearwardly extending tit at its outer end to abut said projection, said cam being adapted to raise said piston during a part of a revolution of said cam shaft and permit it to drop freely thereafter, a motor for rotating said cam shaft, and means controlled by said dropping piston to successively energize an electric circuit for time durations equal to the successive time durations of dropping of said piston from one fixed point in said cylinder to another below it.

12. Viscosity apparatus of the kind described, comprising a tubular member adapted to be substantially vertically disposed within a body of liquid the viscosity of which is to be determined, the lower end of said tubular member being provided with one or more apertures, a droppable body disposed within said tube, the period of its traversing fluid entrapped within the tubular member being a function of the viscosity thereof, means for periodically elevating and releasing said droppable member, indicating and/or recording means for timing the duration of said droppable body in traversing a predetermined portion of said entrapped fluid as an index of viscosity.

AUSTIN S. NORCROSS.

REFERENCES CITED

The following references are of record in the file of this patent:

UNITED STATES PATENTS

| Number | Name | Date |
| --- | --- | --- |
| 358,877 | Perkins | Mar. 8, 1887 |
| 989,822 | Strasburger | Apr. 18, 1911 |
| 1,748,513 | Knopf | Feb. 25, 1930 |
| 1,780,952 | Symmes | Nov. 11, 1930 |
| 2,034,658 | Jones et al | Mar. 17, 1936 |
| 2,066,016 | Rossi et al | Dec. 29, 1936 |
| 2,252,014 | Lupfer | Aug. 12, 1941 |
| 2,305,531 | Hurndall | Dec. 15, 1942 |
| 2,346,746 | Green | Apr. 18, 1944 |
| 2,388,387 | Cohen | Nov. 6, 1945 |
| 2,395,658 | Disney | Feb. 26, 1946 |

FOREIGN PATENTS

| Number | Country | Date |
| --- | --- | --- |
| 345,210 | Great Britain | Mar. 16, 1931 |
| 351,890 | Germany | Apr. 15, 1922 |